United States Patent
Zhu et al.

(10) Patent No.: US 8,021,448 B2
(45) Date of Patent: *Sep. 20, 2011

(54) METHOD AND SYSTEM FOR PRODUCING A HYDROGEN ENRICHED FUEL USING MICROWAVE ASSISTED METHANE PLASMA DECOMPOSITION ON CATALYST

(75) Inventors: Zhonghua John Zhu, Brisbane (AU); Jiuling Chen, Brisbane (AU); Gaoqing Max Lu, Brisbane (AU); Gregory Solomon, Cottesloe (AU)

(73) Assignee: Eden Energy Ltd., Perth (AU)

(*) Notice: Subject to any disclaimer, the term of this patent is extended or adjusted under 35 U.S.C. 154(b) by 923 days.

This patent is subject to a terminal disclaimer.

(21) Appl. No.: 11/657,299

(22) Filed: Jan. 25, 2007

(65) Prior Publication Data
US 2008/0181845 A1    Jul. 31, 2008

(51) Int. Cl.
*B01J 7/00* (2006.01)
*B01J 19/12* (2006.01)
*C01B 3/36* (2006.01)
*C01B 31/00* (2006.01)
*C01B 3/00* (2006.01)
*C01B 4/00* (2006.01)
*C10J 3/46* (2006.01)
*A62D 3/00* (2007.01)

(52) U.S. Cl. .. 48/197 R; 48/61; 204/157.4; 204/157.43; 204/157.47; 204/157.52

(58) Field of Classification Search .......... 48/61, 197 R; 204/157.4, 157.43, 157.47, 157.52
See application file for complete search history.

(56) References Cited

U.S. PATENT DOCUMENTS

| | | | |
|---|---|---|---|
| 4,435,376 A | 3/1984 | Porter et al. | |
| 4,574,038 A | 3/1986 | Wan | |
| 5,015,349 A | 5/1991 | Suib | |
| 5,131,993 A | 7/1992 | Suib | |
| 5,139,002 A | 8/1992 | Lynch et al. | |
| 5,205,912 A | 4/1993 | Murphy | |
| 5,205,915 A | 4/1993 | Ravella et al. | |
| 5,266,175 A | 11/1993 | Murphy | |
| 5,277,771 A * | 1/1994 | Murphy et al. | 204/157.43 |
| 5,277,773 A | 1/1994 | Murphy | |

(Continued)

FOREIGN PATENT DOCUMENTS
AU          51876/99 A       2/2000
(Continued)

OTHER PUBLICATIONS

Office Action dated Oct. 29, 2009 from U.S. Appl. No. 12/040,883, pp. 1-19.

(Continued)

*Primary Examiner* — Matthew Merkling
(74) *Attorney, Agent, or Firm* — Stephen A. Gratton

(57) ABSTRACT

A method for producing a hydrogen enriched fuel includes the steps of providing a flow of methane gas at a selected flow rate, providing a catalyst, producing a methane plasma at a negative pressure using microwave irradiation at a selected microwave power, directing the methane plasma over the catalyst, and controlling the flow of methane gas and the microwave power to produce a product gas having a selected composition. A system for producing a hydrogen enriched fuel includes a methane gas source, a reactor having a reaction chamber containing a catalyst, a microwave power source configured to form a methane plasma, and a vacuum pump configured to maintain the reaction chamber at a negative pressure.

23 Claims, 5 Drawing Sheets

U.S. PATENT DOCUMENTS

| | | | |
|---|---|---|---|
| 5,366,712 | A | 11/1994 | Violante et al. |
| 5,372,617 | A | 12/1994 | Kerrebrock et al. |
| 5,516,967 | A | 5/1996 | Pandey et al. |
| 5,525,322 | A | 6/1996 | Willms |
| 5,972,175 | A | 10/1999 | Tanner et al. |
| 6,165,438 | A | 12/2000 | Willms et al. |
| 6,509,000 | B1 | 1/2003 | Choudhary et al. |
| 6,592,723 | B2 | 7/2003 | Cha |
| 6,759,025 | B2 | 7/2004 | Hong et al. |
| 6,783,632 | B2 | 8/2004 | Cha |
| 6,875,417 | B1 | 4/2005 | Shah et al. |
| 6,994,907 | B2 | 2/2006 | Resasco et al. |
| 6,998,103 | B1 | 2/2006 | Phillips et al. |
| 7,001,586 | B2 | 2/2006 | Wang et al. |
| 7,011,768 | B2 | 3/2006 | Jensen et al. |
| 7,094,386 | B2 | 8/2006 | Resasco et al. |
| 7,094,679 | B1 | 8/2006 | Li et al. |
| 7,119,240 | B2 | 10/2006 | Hall et al. |
| 7,625,544 | B2 | 12/2009 | Liu et al. |
| 2002/0103405 | A1 | 8/2002 | Hatanaka |
| 2002/0146366 | A1 | 10/2002 | Cha |
| 2003/0129122 | A1* | 7/2003 | Chen et al. ............... 423/447.3 |
| 2003/0206855 | A1 | 11/2003 | Cha |
| 2004/0265223 | A1 | 12/2004 | Etievant et al. |
| 2005/0063900 | A1* | 3/2005 | Wang et al. ............... 423/658.2 |
| 2005/0065391 | A1 | 3/2005 | Gattis et al. |
| 2006/0021510 | A1 | 2/2006 | Henley et al. |
| 2006/0037432 | A1 | 2/2006 | Deevi et al. |
| 2006/0163054 | A1 | 7/2006 | Spitzl |
| 2006/0269669 | A1 | 11/2006 | Jiang et al. |
| 2007/0031299 | A1 | 2/2007 | Jiang et al. |
| 2007/0266825 | A1 | 11/2007 | Ripley et al. |
| 2008/0156630 | A1 | 7/2008 | Lee et al. |
| 2008/0159944 | A1 | 7/2008 | Park |
| 2008/0173532 | A1 | 7/2008 | Zhu |
| 2008/0210908 | A1 | 9/2008 | Zhu |
| 2009/0205254 | A1 | 8/2009 | Zhu et al. |

FOREIGN PATENT DOCUMENTS

| | | |
|---|---|---|
| CA | 2031959 A1 | 6/1991 |
| CA | 2084196 A1 | 1/1992 |
| CA | 2103211 A1 | 5/1994 |
| CA | 2103330 A1 | 5/1994 |
| CA | 2338494 | 2/2000 |
| CA | 2453841 A1 | 1/2003 |
| EP | 1423331 A | 2/1976 |
| EP | 0435591 A3 | 7/1991 |
| EP | 0600738 A1 | 6/1994 |
| EP | 0601797 A1 | 6/1994 |
| EP | 1881944 A1 | 1/2008 |
| FR | 2827591 A1 | 1/2003 |
| JP | 6219970 A | 9/1994 |
| JP | 2004-324004 A | 11/2004 |
| JP | 2007000774 A | 1/2007 |
| KR | 2006011876 | 11/2006 |
| MX | 9307285 A1 | 7/1994 |
| MX | 9307330 A1 | 7/1994 |
| WO | 9202448 | 2/1992 |
| WO | 0005167 | 2/2000 |
| WO | WO01/85612 A3 | 11/2001 |
| WO | 03008328 A1 | 1/2003 |
| WO | WO2005/063615 A1 | 7/2005 |
| WO | WO 2006/069254 A1 | 6/2006 |
| WO | WO 2006/107144 | 10/2006 |
| WO | 2006123883 A1 | 11/2006 |
| WO | WO 2006/135378 A2 | 12/2006 |
| WO | WO 2007/033438 A1 | 3/2007 |
| WO | WO 2007/142728 A2 | 12/2007 |
| WO | WO2008/090466 A2 | 7/2008 |
| WO | WO2008/090467 A2 | 7/2008 |
| WO | WO 2008/127380 A2 | 10/2008 |
| WO | WO 2009/103017 A1 | 8/2009 |
| WO | WO 2009/145936 | 12/2009 |

OTHER PUBLICATIONS

Office Action dated Sep. 2, 2009 from U.S. Appl. No. 11/657,212, pp. 1-14.

Search Report and Written Opinion from PCT/US2009/34142 dated Jul. 10, 2009, pp. 1-7.

Search Report prepared by CPA Global, Jul. 23, 2009, pp. 1-13.

FTO Report prepared by PMG associates, Aug. 6, 2009, pp. 1-6.

M. Momirlan & T. Veziroglu, "Recent directions of world hydrogen production", Renewable & Sustainable Energy Reviews, 1999, pp. 219-231, Elsevier Science Ltd.

John N. Armor, "The multiple roles for catalysis in the Production of H2", Applied Catalysis, 1999, pp. 159-175, Elsevier Science B.V.

Menderes Levent et al., "Production of hydrogen-rich gases from steam reforming of methane in an automatic catalytic microreactor", 1999, pp. 945-959, Elsevier Science Ltd.

Rong-Fang Horng et al., "Investigation of the production of hydrogen rich gas in a plasma converter for motorcycle applications", 2006, pp. 2155-2166, Elsevier Ltd.

Annika T. Nielsen et al., "Hydrogen production from organic waste", International Journal of Hydrogen Energy, 2001, pp. 547-550, Elsevier Science Ltd.

O. Khaselev et al. "High-efficiency integrated multijunction photovoltaic/electrolysis systems for hydrogen production", Int Jour of Hydro. Energy, 2001, pp. 127-132, Elsevier.

Chanjuan Xing et al. Band structure-controlled solid solution of Cd1-xZnS photocatalyst for hydrogen production by water splitting, Int Jour of Hydro. Energy, 2006, pp. 2018.

T. V. Choudhary et al., "Hydrogen Production via Catalytic Decomposition of Methane", Journal of Catalysis, 2001, pp. 9-18, Academic Press.

Nazim Muradov, "Hydrogen via methane decomposition: an application for decarbonization of fossil fuels", Inter. Jour of Hydrogen Energy, 2001, p. 1165-1175, Elsevier Science Ltd.

Naresh Shah et al., "Hydrogen Production by Catalytic Decomposition of Methane", Energy & Fuels, 2001, pp. 1528-1534, Amer. Chem. Society.

Pamela L. Spath et al., "Life Cycle Assessment of Hydrogen Production via Natural Gas Steam Reforming", Technical Report, NREL, Golden, CO, 2001, pp. 1-33.

Dr. Joan M. Ogden, "Review of Small Stationary Reformers for Hydrogen Production", Report for the International Energy Agency Agreement, 2001, pp. 1-52, Princeton Univ., NJ.

M. A. Rosen, "Thermodynamic Comparison of Hydrogen Production Processes", Int. J. Hydrogen Energy vol. 21, No. 5, 1996, pp. 349-365, Elsevier Science Ltd.

M. G. Poirier et al., "Catalytic Decomposition of Natural Gas to Hydrogen for Fuel Cell Applications", Int. J. Hydrogen Energy, vol. 22, No. 4, 1997, pp. 429-433, Elsevier Sci.

M.A. Ermakova et al., "Ni/SiO2 and Fe/SiO2 catalysts for production of hydrogen & filamentous carbon via methane decomposition", Catalysis Today 77, 2002, p. 225-235, Elsevier.

Sakae Takenaka, "Methane Decomposition into Hydrogen and Carbon Nanofibers over Supported PD-Ni catalysts", J. Phys. Chem B, 2004, p. 7656-7664, Amer. Chem. Society.

Tatsumi Ishihara et al., "CH4 Decomposition with a Pd-Ag Hydrogen-Permeating Membrane Reactor for Hydrogen Production at Decreased Temp." Ind. Eng. Chem Res. 2002, p. 3365-69.

Heiko Will et al., "Microwave-Assisted Heterogeneous Gas-Phase Catalysis", Chem. Eng. Technology, 2004, p. 113-122, Wiley-VCH.

Hiroshi Nagazoe et al., "Characteristics of Methane Conversion under Combined Reactions of Solid Catalyst with Microwave Plasma", J. Chem Eng. of JP, vol. 39, 2006, p. 314-320.

Jian Huang et al., "Activation of methane in microwave plasmas at high pressure", Res. Chem. Intermed, vol. 27 No. 6, 2001, p. 643-658.

Wonihl Cho et al., "Plasma catalytic reaction of natural gas to C2 product over Pd-NiO/Al2O3 and Pt-Sn/Al2O3 catalysts", Res. Chem. Intermed, vol. 28 No. 4, 2002, p. 343-357.

Carolina Marun et al., "Catalytic Oligomerization of Methane via Microwave Heating", J. Phys. Chem A, 1999, pp. 4332-4340, Amer. Chem. Soc.

Jianhua Tong et al., "Pure hydrogen production by methane steam reforming with hydrogen-permeable membrane reactor", Catalysis Today, 2006, pp. 147-152, Elsevier.

Xunli Zhang et al., "Apparent equilibrium shifts and hot-spot formation for catalytic reaction inducted by microwave dielectric heating", Chem. Commun., 1999, pp. 975-976.
Kui Zhang et al., "Conversion of Greenhouse Gases to Synthesis Gas and Higher Hydrocarbons", Energy & Fuels 2001, 15, 2001 American Chemical Society, pp. 395-402.
Kui Zhang et al. Direct Conversion of Greenhouse Gases to synthesis Gas and $C_4$ Hydrocarbons over Zeolite HY Promoted by a Dielectric-Barrier Discharge, Ind. Eng. Chem. Res. 2002, 41, 2002 American Chemical Society, pp. 1462-1468.
Wonihl Cho et al., "Conversion of natural gas to hydrogen and carbon black by plasma and application of plasma carbon black", Catalysis Today 98 (2004) no month, Elsevier, pp. 633-638.
David O. Conney and Zhenpeng Xi, "Production of Hydrogen From Methane/Steam in a Microwave irradiated Char-Loaded Reactor", Fuel Science & Technology Int'l, 14(8), pp. 1111-1141, (1996) no month.
J. R. Thomas Jr., Particle size effect in microwave-enhanced catalysis, Catalysis Letter 49, J. C. Balltzer AG, Science Publishers, Oct. 19, 2007, pp. 137-141.
PCT International Application No. PCT/IB2008/000538 Search Report and Written Opinion dated Aug. 29, 2008, pp. 1-9.
PCT International Application No. PCT/IB2008/000508 Search Report and Written Opinion dated Aug. 26, 2008, pp. 1-14.
U.S. Appl. No. 12/030,970, filed Feb. 14, 2008.
Wonihl Cho et al., "Conversion of natural gas to hydrogen and carbon black by plasma and application of plasma carbon black", Catalysis Today 98 (2004) no month, Elsevier, pp. 633-638.
David O. Conney and Zhenpeng Xi, "Production of Hydrogen From Methane/Steam in a Microwave Irradiated Char-Loaded Reactor", Fuel Science & Technology Int'l, 14(8), pp. 1111-1141 (1996) no month.
Office Action from U.S. Appl. No. 11/657,212 dated Jun. 24, 2010, pp. 1-19.
Office Action from U.S. Appl. No. 11/657,212 dated Feb. 2, 2010, pp. 1-16.
Office Action from U.S. Appl. No. 12/040,883 dated Apr. 6, 2010, pp. 1-20.
Office Action from U.S. Appl. No. 11/657,212 dated Dec. 1, 2010, pp. 1-7.
International application No. PCT/US2009/034142, Preliminary Report on Patentability dated Aug. 25, 2010, pp. 1-6.
Russian Patent Application Serial No. 2009128365/05, translation of Office Action (associate's short comments), Nov. 21, 2010, pp. 1-2.
Russian Patent Application Serial No. 2009128365/05, translation of Official Grant Notification issued by the Russian Patent Office on Jan. 13, 2011, p. 1.
New Zealand Patent Application Serial No. 578553, Examination Report dated Sep. 17, 2010, p. 1.
Russian Patent Application Serial No. 2009 128364/05, translation of Office Action (associate's short comments), Nov. 11, 2010, pp. 1-2.
New Zealand Patent Application Serial No. 578552, Examination Report dated Sep. 17, 2010, pp. 1-2.
Office Action from U.S. Appl. No. 11/657,212 dated May 10, 2011, pp. 1-19.
Office Action from U.S. Appl. No. 12/040,883 dated May 10, 2011, pp. 1-14.
Examiner's first report on Australia Patent Application Serial No. 2008208614 dated Feb. 25, 2011, pp. 1-2.
Examination Report on New Zealand Patent Application Serial No. 579553 dated Feb. 3, 2011, pp. 1-2.
First Office Action from the State Intellectual Property Office of the PRC in Patent Application No. 200880006502.8 (English translation), pp. 1-11.

* cited by examiner

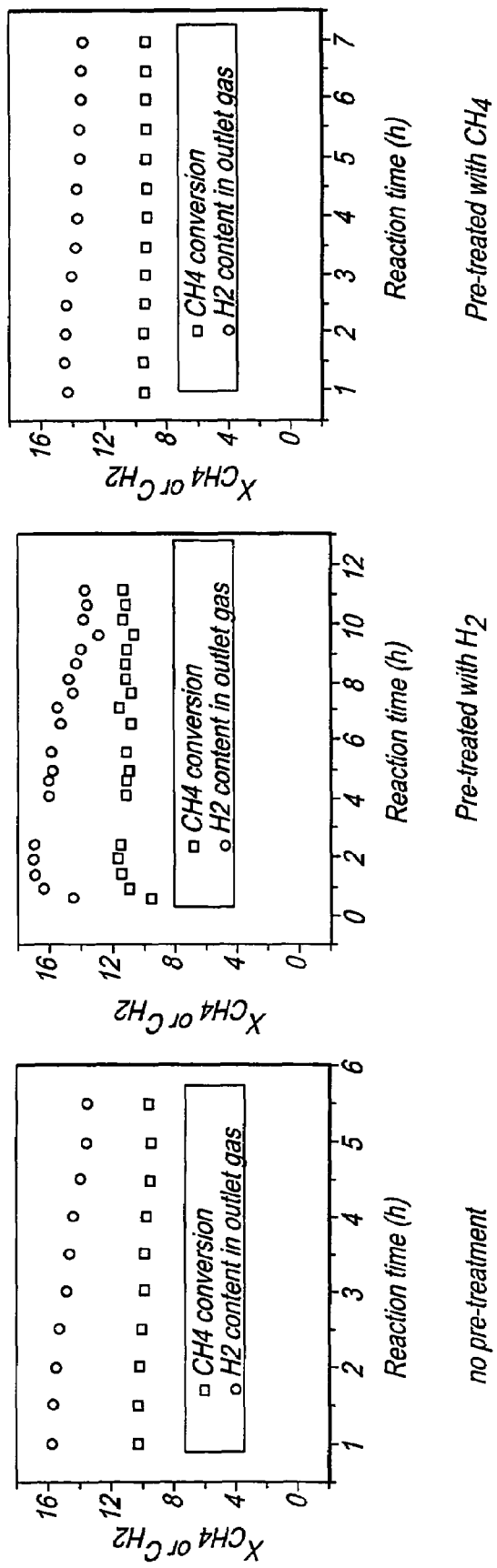
FIG. 4C  Pre-treated with CH4
FIG. 4B  Pre-treated with H2
FIG. 4A  no pre-treatment

METHOD AND SYSTEM FOR PRODUCING A HYDROGEN ENRICHED FUEL USING MICROWAVE ASSISTED METHANE PLASMA DECOMPOSITION ON CATALYST

CROSS REFERENCE TO RELATED APPLICATIONS

This application is related to Ser. No. 11/657,212, filed Jan. 24, 2007, Publication No. US-2008-0173532-A1; to Ser. No. 12/030,970, filed Feb. 14, 2008, Publication No. US-2009-0205254-A1; and to Ser. No. 12/040,883, filed Mar. 1, 2008, Publication No. US-2008-0210908-A1.

FIELD OF THE INVENTION

This invention relates generally to the production of hydrogen fuels, and particularly to a method and a system for producing a hydrogen enriched fuel suitable for use as an alternative fuel.

BACKGROUND OF THE INVENTION

Gaseous alternative fuels, such as hydrogen and natural gas, are valued for their clean burning characteristics in motor vehicle engines. Various processes have been developed for producing hydrogen. These processes include electrolysis, exotic water splitting, and separation from industrial waste streams.

Hydrogen can also be produced by reforming natural gas. Typically, a multi-step process is used to convert a hydrocarbon fuel, such as methane, propane or natural gas, into a high purity hydrogen gas stream. The steps of the process typically include (1) synthesis gas generation, (2) water-gas shift reaction, and (3) gas purification (e.g., CO and $CO_2$ removal). The hydrogen gas stream can then be used for a variety of purposes including mixture with other gases to produce an alternative fuel.

For example, a particularly clean burning gaseous alternative fuel known as HYTHANE comprises a mixture of hydrogen and natural gas. The prefix "Hy" in HYTHANE is taken from hydrogen. The suffix "thane" in HYTHANE is taken from methane, which is the primary constituent of natural gas. HYTHANE is a registered trademark of Brehon Energy PLC. HYTHANE typically contains about 5% to 7% hydrogen by energy, which corresponds to 15% to 20% hydrogen by volume.

For producing hydrogen, one type of reformer called a "steam reformer" uses a hydrocarbon fuel and steam ($H_2O$). In the steam reformer, the hydrocarbon fuel is reacted in a heated reaction tube containing steam ($H_2O$) and one or more catalysts. In general, the production of a high purity hydrogen gas by reforming requires high temperatures (800-900° C.). Steam reforming also produces impurities, particularly CO and $CO_2$, which if not removed, are ultimately released to the atmosphere.

The production of a high purity hydrogen gas by reforming also requires large capital costs for the equipment, and large operating costs, particularly for power. In addition to these shortcomings, it is difficult to manufacture a compact embodiment of a steam reformer. It would be advantageous for a hydrogen production system to have a relatively compact size, such that alternative fuels could be produced at a facility the size of a gas station, rather than at a facility the size of a refinery.

Another process for producing hydrogen from natural gas involves the thermal decomposition of methane. For example, methane decomposes into hydrogen by the reaction:

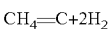

$$CH_4 = C + 2H_2$$

For example, the thermal decomposition of natural gas has been used in the "Thermal Black Process" for producing carbon black and hydrogen. Using thermal decomposition, the energy requirements per mole of hydrogen produced (37.8 kJ/mol $H_2$) is considerably less than the energy requirements of the steam reforming process (63.3 kJ/mol $H_2$). However, the process still requires high temperatures (e.g., 1400° C.), high equipment costs, and high energy expenditures.

Recently, thermal decomposition of natural gas has been investigated in combination with various catalysts, which allow the reaction to proceed at lower temperatures. For example, U.S. Pat. No. 7,001,586 B2, to Wang et al. discloses a thermal decomposition process in which two catalysts having the formula $Ni_xMg_yO$ and $Ni_xMg_yCu_zO$, respectively, are used to decompose methane to carbon and hydrogen. The former needs a lower temperature from about 425° C. to 625° C., but the lifetime is shorter and the activity is lower. The latter's lifetime is longer and the activity is higher, but the required reaction temperature is much higher, from about 600° C. to 775° C. More importantly, however, these processes require high energy expenditures to heat the wall of the reactor, the gas and the catalysts.

Methane plasma has been used to convert methane into C2 (such as $C_2H_2$, $C_2H_4$, $C_2H_6$) and hydrogen. When microwave plasma is combined with a metal catalyst, the metal catalyst is heated by microwave energy. The combination of methane microwave plasma with the metal catalyst as reported in the literature so far, can efficiently convert methane to $C_2H_2$, $C_2H_4$ and $C_2H_6$ and H2 is a by product. But the product gas comprises C2 and $H_2$ with a stoichiometric relation, and can not be directly used as HYTHANE due to the high concentration of C2. In addition, the prior art catalysts are sensitive to carbon deposition, which deactivates the catalyst and decreases the production of both C2 and $H_2$.

It would be advantageous for a hydrogen production system to be capable of performance at lower temperatures and lower energy expenditures, with a variety of catalysts active for long periods, and with minimal carbon emissions (e.g., CO, $CO_2$) and negligible higher order hydrocarbons. In addition, it would be advantageous for a hydrogen production system to have a size and configuration adaptable to the production of alternative fuels containing hydrogen. The present disclosure is directed to a method and a system for producing a hydrogen enriched fuel that overcomes many of the shortcomings of prior art hydrogen production systems.

The foregoing examples of the related art and limitations related therewith are intended to be illustrative and not exclusive. Other limitations of the related art will become apparent to those of skill in the art upon a reading of the specification and a study of the drawings. Similarly, the following embodiments and aspects thereof are described and illustrated in conjunction with a system and method, which are meant to be exemplary and illustrative, not limiting in scope.

SUMMARY OF THE INVENTION

A method for producing a hydrogen enriched fuel includes the steps of providing a flow of methane gas at a selected flow rate, providing a catalyst, producing a methane plasma at a negative pressure using microwave irradiation at a selected microwave power, directing the methane plasma over the catalyst, and controlling the flow of methane gas and the microwave power to produce a product gas having a selected composition.

The method can be performed in a reactor having microwave transparent walls. In addition, the catalyst can comprise a metal, such as a Ni-based compound prepared by coprecipitation. During performance of the method, the metal catalyst is selectively heated by microwave energy, while the methane gas and microwave transparent reactor walls maintain a low temperature. On the hot surface of the catalyst, the reactions of the hydrocarbons, $CH_4$, $C_2H_2$, $C_2H_4$, $C_2H_6$, and the radicals $CH_{3\_}$, $CH_{2\_}$, $CH\_$, $H\_$ produce hydrogen ($H_2$) and carbon (C) in solid fibrous form. In addition, some of the methane gas fails to react (methane slip) such that the product gas comprises methane, hydrogen and negligible higher order hydrocarbons.

The flow of methane gas and the microwave power can be controlled such that the composition of the product gas approximates the chemical composition of HYTHANE. For example, the product gas can comprise from about 10% to 30% hydrogen by volume, and from about 70% to 90% methane by volume. Advantageously, the product gas contains almost no carbon monoxide and carbon dioxide, as the carbon contained in the converted methane is mainly removed as solid fibrous carbon, which drops out as a useful by-product. Further, the catalyst is selected and formulated to remain stable and active under operating conditions (e.g., gas flow rate, microwave power, catalyst amount), such that costs are minimized.

A system for producing a hydrogen enriched fuel includes a methane gas source configured to provide a methane gas flow; a reactor having a reaction chamber in flow communication with the methane gas source and with a vacuum pump; a microwave power source configured to form a methane plasma in the reaction chamber at a negative pressure; and a catalyst in the reaction chamber configured to contact the methane plasma and to initiate a reaction in which a product gas has a selected volumetric percentage of hydrogen and methane.

In an alternate embodiment of the method, the product gas is further processed to recover hydrogen in substantially pure form. To recover substantially pure hydrogen, the product gas can be flowed under a vacuum through a Pd/Ag membrane coated on a porous metal or ceramic substrate.

BRIEF DESCRIPTION OF THE DRAWINGS

Exemplary embodiments are illustrated in the referenced figures of the drawings. It is intended that the embodiments and the figures disclosed herein are to be considered illustrative rather than limiting.

FIGS. 4A-4C are graphs showing the effects of catalyst pretreatment on $CH_4$ conversion and $H_2$ content in the outlet gas (product gas) expressed as "$X_{CH4}$ or $C_{H2}$" on the y-axis versus reaction time (h) on the x-axis for the catalyst Ni81Al.

DETAILED DESCRIPTION OF THE PREFERRED EMBODIMENTS

The following definitions are used in the present disclosure. HYTHANE means a hydrogen enriched alternative fuel comprised of hydrogen and methane and impurities included in hydrogen and natural gas.

Methane slip means unreacted methane which passes through a system without reacting.

Microwave irradiation means electromagnetic irradiation in the range of 0.3 to 300 GHz.

Negative pressure means a pressure less than atmospheric pressure (i.e., less than 1 atm).

Method

Figure 1:
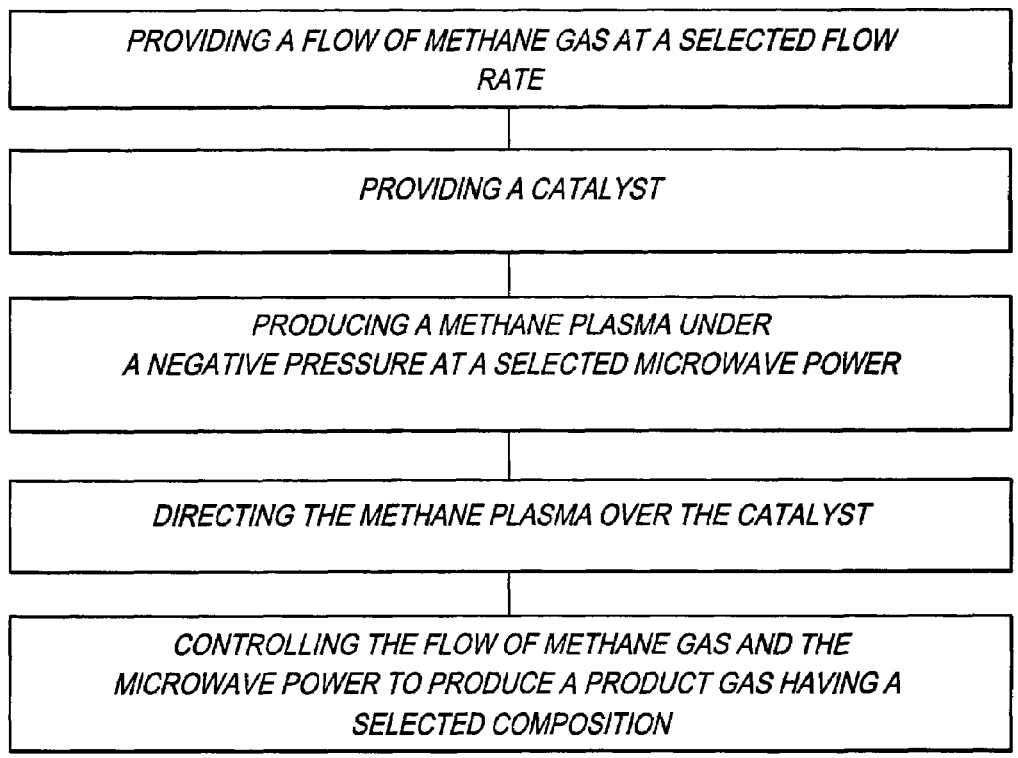
FIG. 1 is a flow diagram illustrating steps in a method for producing a hydrogen enriched fuel.

Referring to FIG. 1, steps in a method for producing a hydrogen enriched fuel are illustrated. The first step comprises "providing a flow of methane gas at a selected flow rate". By way of example, the methane gas can be in the form of pure methane gas. Alternately, the methane gas can be in the form of natural gas obtained from a "fossil fuel" deposit. Natural gas is typically about 90+% methane, along with small amounts of ethane, propane, higher hydrocarbons, and "inerts" like carbon dioxide or nitrogen. In addition, the methane gas can be supplied from a tank (or a pipeline) at a selected temperature and pressure. Preferably, the methane gas is provided at about room temperature (20 to 25° C.), and at about atmospheric pressure (1 atmosphere). Further, the methane gas can be provided at the selected flow rate. In the examples to follow, the selected flow rate of the methane gas is about 120 ml/minute (STP).

As also shown in FIG. 1, the method includes the step of "providing a catalyst". Preferably, the catalyst is provided in the form of particles having a diameter of from 74 μm to 140 μm. In addition, the catalyst is preferably contained on a holder, which allows the methane gas to flow freely along the surfaces of the catalyst particles. In addition, catalysts in the form of metal oxides can be pre-treated using $H_2$ to reduce the metal oxide to a metal.

A preferred metal for the catalyst comprises Ni, or an alloy containing Ni. For example, the metal can comprise NiAl, or Ni doped with Cu, Pd, Fe, Co, or an oxide such as MgO, ZnO, $Mo_2O_3$ or $SiO_2$. Specific catalysts include Ni100, Ni81Al, Ni93Al, Ni77Cu16Al, Ni54Cu27Al and Ni83Mg6Al. In addition, nickel based catalyst precursors can be prepared by coprecipitation from a mixed aqueous solution of nitrates with sodium carbonate.

The following Table 1 provides information on catalyst preparation of nickel-based precursors for the above catalysts. These catalysts were prepared by coprecipitation from a mixed aqueous solution of nitrates with sodium carbonate.

TABLE 1

| | Catalyst Preparation | |
|---|---|---|
| | Catalyst Composition | |
| 1 | Ni100 | 100 wt. % NiO |
| 2 | Ni81Al | 81 wt. % NiO—19 wt. % $Al_2O_3$ |
| 3 | Ni93Al | 93 wt. % NiO—7 wt. % $Al_2O_3$ |
| 4 | Ni77Cu16Al | 77 wt. % NiO—16 wt. % CuO—7 wt. % $Al_2O_3$ |
| 5 | Ni54Cu27Al | 54 wt. % NiO—27 wt. % CuO—9 wt. % $Al_2O_3$ |
| 6 | Ni83Mg6Al | 83 wt. % NiO—6 Wt. % MgO—11 wt. % $Al_2O_3$ |

However, rather than Ni or an alloy thereof, the catalyst can comprise another metal, such as a metal selected from group VIII of the periodic table including Fe, Co, Ru, Pd and Pt. In any case, the catalyst is selected and formulated to remain stable under reaction conditions for long periods of time. In the examples to follow there was no indication that the catalyst was going to be deactivated, even after over 11 hours of reaction time.

As also shown in FIG. 1, the method includes the step of "producing a methane plasma under a negative pressure at a selected microwave power". This step can be performed using a conventional microwave generator and microwave circulator.

In the examples to follow, the microwave generator was operated at a power of about 70-140 watts. However, it is to be understood that the method can be practiced at a microwave power that is selected to achieve a desired product gas composition. For example, a representative range for the microwave power can be from 50 watts to 300 watts. Also in the examples to follow, the microwave generator was operated at a frequency of 2.45 GHz.

A negative pressure can be exerted on the methane plasma using a suitable mechanism such as a vacuum pump. In the examples to follow the negative pressure on the methane gas was about 60 mmHg. However, it is to be understood that the method of the invention can be practiced using a negative pressure of from 20 mmHg to 200 mmHg.

As also shown in FIG. 1, the method includes the step of "directing the flow of methane gas over the catalyst". This step can be performed by placing the catalyst in a microwave transparent reactor having a reaction chamber in flow communication with a vacuum pump configured to contain the catalyst, and to direct the flow of methane gas over the catalyst. $H_2$ and solid carbon in the form of solid fibrous carbon are formed on the surface of the catalyst.

As also shown in FIG. 1, the method includes the step of "controlling the flow of methane gas and the microwave power to produce a product gas having a selected composition". This step can be performed using a microwave generator having variable power controls.

System

Figure 2:
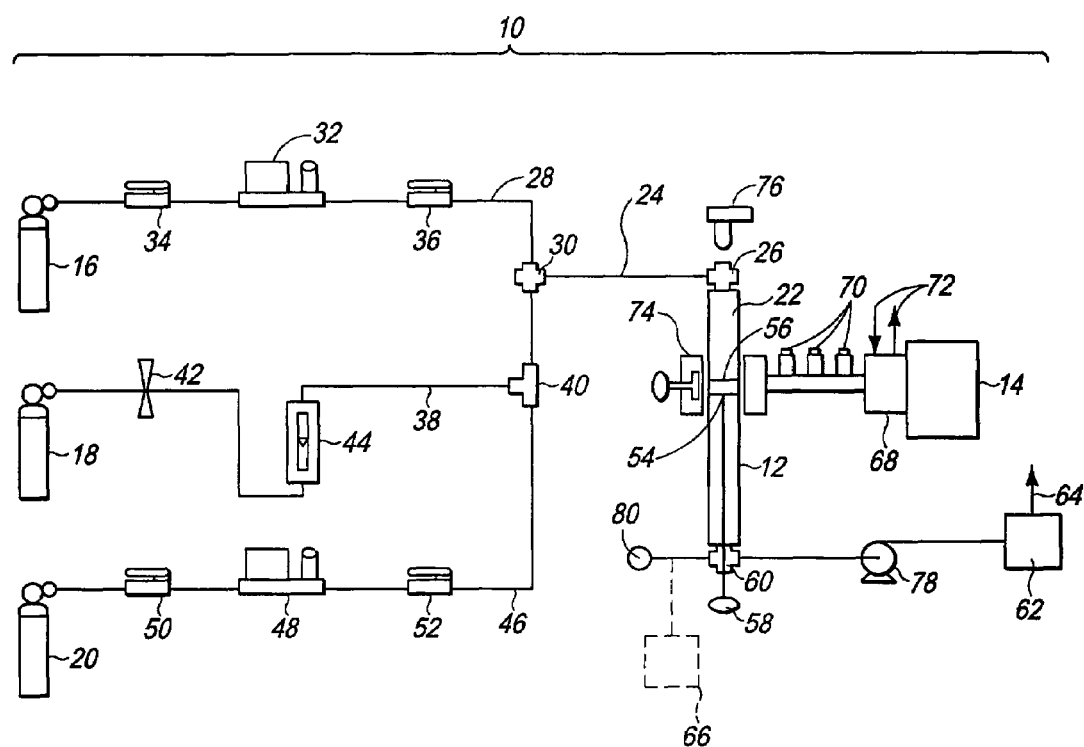
FIG. 2 is a schematic drawing of a system for producing a hydrogen enriched fuel.

Referring to FIG. 2, a system 10 for producing a hydrogen enriched fuel, in accordance with the previously described method, is illustrated. The system 10 includes a reactor 12, and a microwave generator 14. The system also includes a methane supply 16, a hydrogen supply 18, and an inert gas supply 20 in flow communication with the reactor 12.

The reactor 12 (FIG. 2) can comprise a conventional tube reactor made of a microwave transparent material, such as quartz. In addition, the reactor 12 includes a sealed process chamber 22 having an inlet 26 in flow communication with a supply conduit 24.

The supply conduit 24 (FIG. 2) is in flow communication with a methane conduit 28 via a union 30, which is in flow communication with the methane supply 16. In addition, the methane conduit 28 includes a methane mass flow controller 32 configured to remotely control the flow of methane gas into the reaction chamber 22, and shut off valves 34, 36 on either side of the methane mass flow controller 32. In the illustrative embodiment, the methane supply 16 is configured to provide pure methane. However, it is to be understood that the system 10 can include, and the method can be practiced, using another methane source, such as natural gas.

The supply conduit 24 (FIG. 2) is also in flow communication with a hydrogen conduit 38 via a union 40, which is in flow communication with the hydrogen gas supply 18. The hydrogen conduit 38 includes a needle valve 42 configured to manually regulate the flow of hydrogen gas into the reaction chamber 22, and a rotameter 44 configured to measure the hydrogen flow.

The supply conduit 24 (FIG. 2) is also in flow communication with an inert gas conduit 46, which is in flow communication with the inert gas supply 20. The inert gas can comprise Ar or another inert gas, such as He or Ne. The inert gas conduit 46 also includes an inert gas mass flow controller 48 configured to remotely control the flow of inert gas into the reaction chamber 22, and shut off valves 50, 52 on either side of the inert gas mass flow controller 48. The inert gas conduit 46 can be used to purge the reaction chamber 22.

In addition to the reaction chamber 22 (FIG. 2), the reactor 12 includes a holder 54 configured to hold a catalyst 56 in the reaction chamber 22. As with the reactor 12 and the walls of the reaction chamber 22, the holder 54 is made of a microwave transparent material. In addition, the holder 54 has a cup like configuration with openings that permit gas flow through the holder 54 and around the catalyst 56. The holder 54 also includes a handle 58 configured to permit removal of the holder 54 and the catalyst 56 from the reaction chamber 22.

The reactor 12 (FIG. 2) also includes an outlet 60 in flow communication with the reaction chamber 22. The outlet 60 of the reactor 12 is configured to exhaust the product gas formed in the reaction chamber 22. The outlet 60 of the reactor 12 is in flow communication with a vacuum pump 78 configured to maintain a negative pressure in the reaction chamber 22. A pressure gage 80 is also provided for measuring the pressure in the reaction chamber 22. The outlet 60 of the reactor 12 is also in flow communication with a gas chromatograph 62 configured to analyze the chemical composition of the product gas exiting the reaction chamber 22. In addition, the gas chromatograph 62 is in flow communication with a vent 64 configured to vent product gases, which have been analyzed to the atmosphere. The outlet 60 of the reactor 12 can also be in flow communication with a product gas storage vessel 66 configured to store the product gas for future use.

The microwave generator 14 (FIG. 2) of the system 10 is configured to direct microwave radiation through a microwave circulator 68, and through a three stub tuner 70, to irradiate the methane gas in the reaction chamber 22 to form the methane plasma. The microwave circulator 68 also includes a cooling system 72. In addition, a microwave adjust plug 74 is configured to remotely adjust the reflected power and the position of the plasma ball of the microwave generator 14.

The system 10 (FIG. 2) also includes an infrared temperature sensor 76 configured to measure the temperature of the catalyst 56.

EXAMPLES

Using the previously described method (FIG. 1), and the previously described system 10 (FIG. 2), a hydrogen enriched fuel comprising $CH_4$ and $H_2$ was produced under the following conditions.
A. Pure methane gas (99.7% purity) was supplied through the methane supply conduit 28 to the reactor 12 (FIG. 2).
B. Methane flow rate (i.e., selected flow rate in FIG. 1): 120 ml/minute.
C. Catalyst: Ni81Al, Ni93Al, Ni100, Ni77Cu16Al, Ni54Cu27Al, or Ni83MgAl
D. Amount of catalyst 56 (FIG. 2): 200 mg.
E1. Catalyst 56 (FIG. 2) not reduced, or alternately reduced;

E2. Catalyst 56 (FIG. 2) was reduced for a period of several minutes in $H_2$ plasma at a microwave power of 160 W. For reducing the catalyst 56 (FIG. 2), a flow of $H_2$ gas was supplied through the hydrogen supply conduit 38 (FIG. 2) to the reaction chamber 22 (FIG. 2), and irradiated with microwave energy from the microwave generator 14 (FIG. 2) to form a methane plasma.

F. Reaction pressure: 60 mmHg.

G. Microwave power (Forward Watts) applied to form the methane plasma: 70-140 W.

H. The catalyst was pretreated by $H_2$ at 160 W for 20 minutes unless otherwise stated.

I. Products (hydrogen enriched fuel): $H_2$, $C_2H_2$, $C_2H_4$, $C_3H_8$, $C_3H_6$, $C_3H_4$ and $C_4$.

J. $H_2$ content in the product by volume: approximately 10% to 30%.

K. Unreacted methane: approximately 70% to 90%.

Figure 3A:
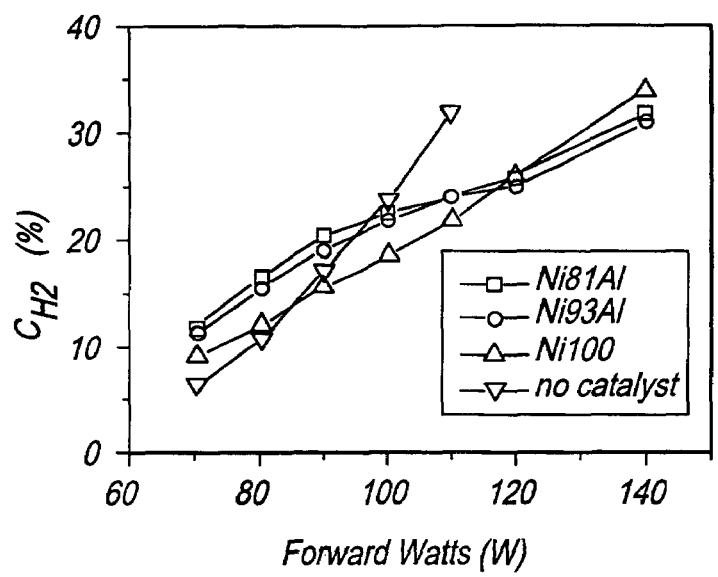
FIGS. 3A and 3B are graphs showing hydrogen content ($C_{H2}$(%)) on the y-axis versus forward watts (Forward Watts (W)) on the x-axis during practice of the method for different catalysts and no catalyst.
Figure 3B:
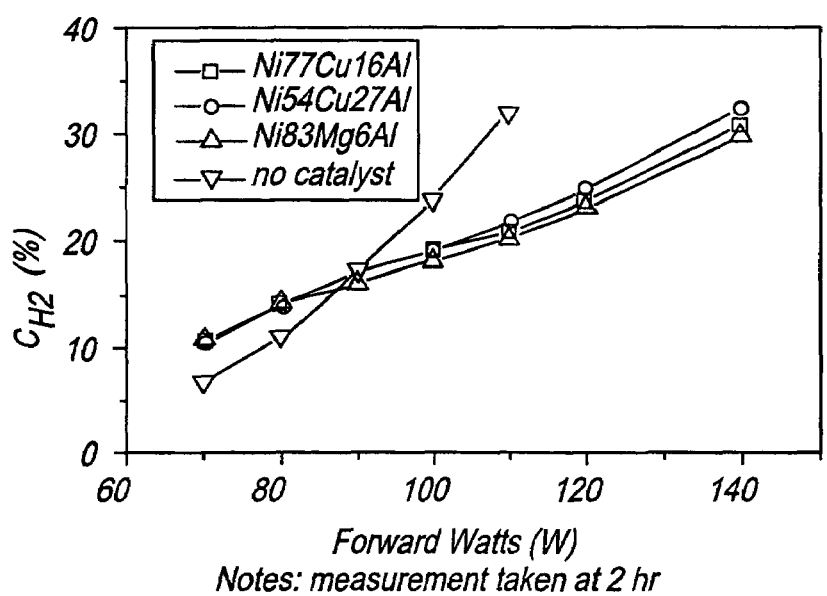

FIGS. 3A and 3B show the "Influence of forward Watts" (i.e., the microwave power for forming the methane plasma) on the production of $H_2$ for different catalysts 56 (FIG. 2) and for "no catalyst". In FIGS. 3A and 3B, the x axis represents "Forward Watts", and the y axis represents the percentage content of $H_2$ expressed as "$C_{H2}\%$" In FIG. 3A, the hydrogen content in the product gas over the catalyst Ni81Al is represented by squares, over the catalyst Ni93Al is represented by circles, over the catalyst Ni100 is represented by triangles, and the hydrogen content with no catalyst is represented by inverted triangles. In FIG. 3B, the hydrogen content in the product gas over the catalyst Ni77Cu16Al is represented by squares, over the catalyst Ni54Cu27Al is represented by circles, over the catalyst Ni83Mg6Al is represented by triangles, and the hydrogen content with no catalyst is represented by inverted triangles. A larger forward Watts leads to a higher hydrogen content in the product gas. These figures demonstrate that the use of a catalyst increases the content of hydrogen in the product gas below approximately 90 W, but decreases the hydrogen content above approximately 90 W. The catalyst Ni81Al has the best performance among the catalysts.

Table 2 shows the influence of forward Watts (microwave power for forming the methane plasma) on the product gas composition during performance of the method without a catalyst. It can be seen that while hydrogen content in the product gas increases with the increase of forward watts, the produced high order hydrocarbons also increase except that the content of $C_2H_2$ remains nearly constant. The major hydrocarbons produced are $C_2H_4$ and $C_2H_2$.

TABLE 2

Influence of forward Watts on product gas composition without catalyst (measurement taken at 2 hr)

| | Composition (%) | | | | |
|---|---|---|---|---|---|
| | 70 W | 80 W | 90 W | 100 W | 110 W |
| $H_2$ | 6.28 | 10.42 | 16.15 | 22.18 | 29.24 |
| $CH_4$ | 90.49 | 84.85 | 77.58 | 70.65 | 62.01 |
| $C_2H_4$ | 0.71 | 1.57 | 2.86 | 4.14 | 5.88 |
| $C_2H_2$ | 2.21 | 2.72 | 2.77 | 2.40 | 2.04 |
| $C_3H_6$ | 0.06 | 0.12 | 0.18 | 0.21 | 0.22 |
| $C_3H_8$ | 0.21 | 0.25 | 0.30 | 0.22 | 0.27 |
| $C_3H_4$ | 0.04 | 0.07 | 0.16 | 0.21 | 0.33 |

Table 3 shows the influence of forward Watts (microwave power for forming the methane plasma) on the product gas composition during performance of the method with the catalyst Ni81Al. As can be seen similarly to the case without catalysts (shown in Table 2), hydrogen and higher order hydrocarbons produced by the method increase with the increase in forward Watts except that $C_2H_2$ content remains nearly constant. However, the produced $C_2H_4$ over Ni81Al is significantly reduced compared with no catalyst (Table 2). This result is particularly advantageous for an alternative fuel in the form of "HYTHANE".

TABLE 3

Influence of forward Watts on product gas composition with Ni81Al catalyst (measurement taken at 2 hr)

| | Composition (%) | | | | | | |
|---|---|---|---|---|---|---|---|
| | 70 W | 80 W | 90 W | 100 W | 110 W | 120 W | 140 W |
| $H_2$ | 11.55 | 16.11 | 19.71 | 21.72 | 23.06 | 24.59 | 29.52 |
| $CH_4$ | 85.67 | 80.39 | 76.48 | 74.07 | 72.33 | 70.25 | 62.95 |
| $C_2H_4$ | 0.249 | 0.435 | 0.560 | 0.739 | 1.033 | 1.615 | 4.017 |
| $C_2H_2$ | 2.341 | 2.695 | 2.817 | 2.982 | 3.014 | 2.969 | 2.766 |
| $C_3H_6$ | 0.015 | 0.041 | 0.055 | 0.067 | 0.094 | 0.117 | 0.201 |
| $C_3H_8$ | 0.131 | 0.233 | 0.270 | 0.314 | 0.339 | 0.338 | 0.342 |
| $C_3H_4$ | 0.013 | 0.043 | 0.048 | 0.049 | 0.060 | 0.040 | 0.098 |

FIGS. 4A-4C are graphs showing the effects of catalyst pretreatment on $CH_4$ and $H_2$ conversion in the outlet gas (product gas) expressed as "$X_{CH4}$ or $C_{H2}$" on the y-axis versus reaction time (h) on the x-axis for the catalyst Ni81Al. In FIG. 4A, the method was performed with no pretreatment. In FIG. 4B, the method was performed by pretreating the catalyst with $H_2$ at 160 W for 20 minutes. In FIG. 4C, the method was performed by pretreating the catalyst with $CH_4$ at 120 W for 20 minutes. In FIGS. 4A-4C $CH_4$ conversion is represented by squares, and $H_2$ conversion is represented by circles. It was determined that pretreatment with hydrogen increases the activity of the catalyst at the beginning, but the activities of the catalyst with or without pretreatment become nearly the same after the catalyst reaches a stable stage.

Figure 5B:
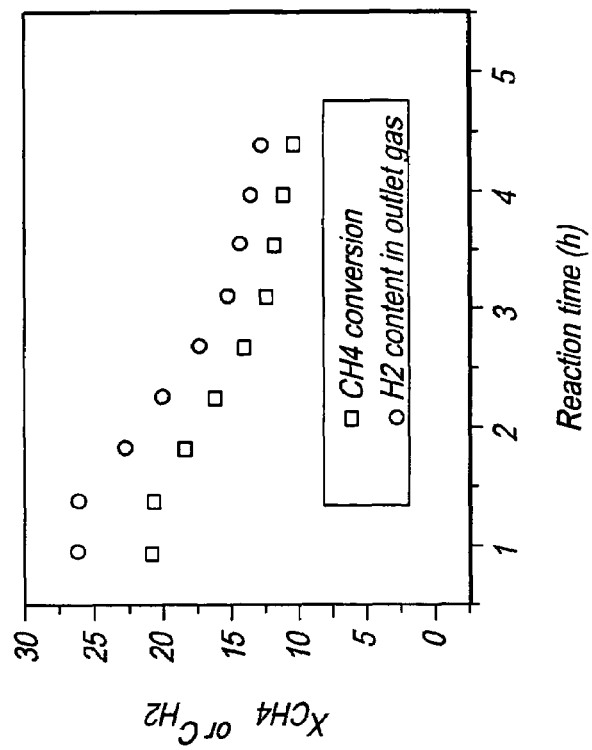
FIGS. 5A-5B are graphs comparing the stability of the catalyst Ni81Al at 80 watts and 110 watts expressed as "$X_{CH4}$ or $C_{H2}$" on the y-axis versus reaction time (h) on the x-axis.
Figure 5A:
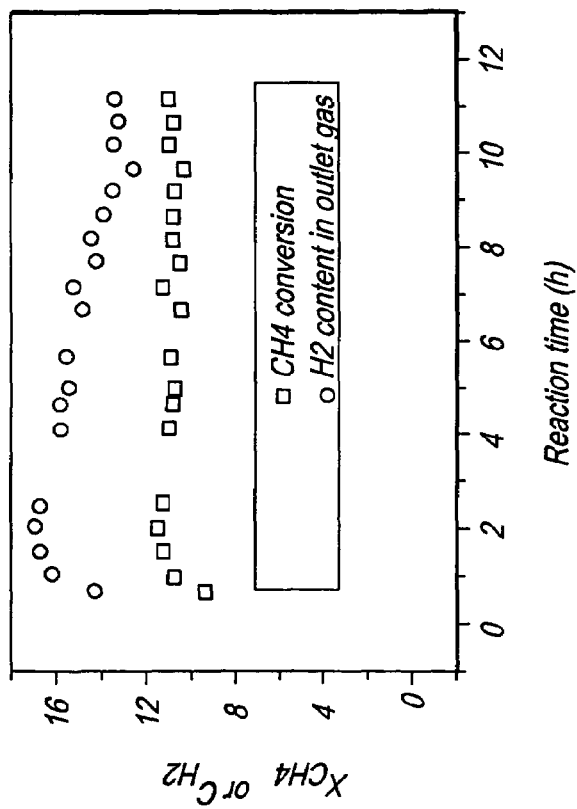

FIGS. 5A-5B are graphs comparing the stability of the catalyst Ni81Al at 80 Watts and 110 Watts expressed as "$X_{CH4}$ or $C_{H2}$" on the y-axis versus reaction time (h) on the x-axis. In FIGS. 5A-5B, $CH_4$ conversion is represented by squares, and $H_2$ conversion is represented by circles. It was determined that the stability of Ni81Al at 110 W is poor, but good at 80 W. In addition, the conversion of methane at 110 W decreases from about 21% to about 11% within 4.5 hours, while it is constant at 12% for 11 hours at 80 W.

From the preceding examples the following conclusions were reached.

(1) Although the catalyst can be pretreated with hydrogen (e.g., at 160 W for 20 minutes), pretreatment is not necessary for the practice of the method. The pretreatment only helps the catalyst at the initial stage, but after some hours, the activities of the catalyst with or without pretreatment are nearly the same. This is important for practical operation.

(2) Ni81Al is the preferred catalyst, as it functions to increase the hydrogen content of the product gas from about 10% without catalyst to about 15% with the Ni81Al catalyst (i.e., a 50% improvement). The presence of the catalyst Ni81Al also significantly decreases the content of higher order hydrocarbons in the product gas (particularly $C_2H_4$) at 80 W. A low percentage of higher order hydrocarbons is important for "HYTHANE".

(3) In the presence of a catalyst, a microwave power of about 80 W is preferred for maintaining the stability of the catalyst, a higher forward Watts significantly decreases the stability of the catalyst.

Alternate Embodiment for Producing Pure Hydrogen

An alternate embodiment of the method includes the additional step of further processing the product gas to recover hydrogen in substantially pure form. One method for recovering pure hydrogen is to flow the product gas under a vacuum through a Pd/Ag membrane coated on a porous metal or ceramic substrate. U.S. Pat. No. 6,165,438, to Willms et al., which is incorporated herein by reference, discloses an apparatus and method for the recovery of hydrogen from a gas containing hydrocarbons.

Thus the disclosure describes an improved method and system for producing a hydrogen enriched fuel. While the description has been with reference to certain preferred embodiments, as will be apparent to those skilled in the art, certain changes and modifications can be made without departing from the scope of the following claims.

What is claimed is:

1. A method for producing a hydrogen enriched fuel comprising:
providing a flow of methane gas at a selected flow rate;
preparing a catalyst comprising NiO and $Al_2O_3$ by coprecipitation of a nickel based catalyst precursor from an aqueous solution;
irradiating the methane gas under a negative pressure using microwave irradiation at a selected microwave power to form a methane plasma;
directing the methane plasma over the catalyst to convert at least some of the methane gas to fibrous carbon and hydrogen; and
controlling the flow of methane gas and the microwave power to produce a product gas comprising about 10% to 30% hydrogen by volume, about 70% to 90% methane by volume and a solid carbon product comprising the fibrous carbon.

2. The method of claim 1 wherein the catalyst has a composition of Ni81Al, Ni93Al, Ni77Cu16Al, Ni54Cu27Al or Ni83Mg6Al.

3. The method of claim 1 wherein the irradiating step is performed by placing the catalyst on a microwave transparent holder having a plurality of openings configured to allow the flow of methane gas around the catalyst.

4. The method of claim 1 wherein the microwave power is from about 70 W to 140 W and the selected flow rate of the methane gas is about 120 ml/minute.

5. The method of claim 1 further comprising pretreating the catalyst with a hydrogen plasma prior to the directing step at a second microwave power greater than the selected microwave power.

6. The method of claim 1 wherein the directing step is performed in a tube reactor made of a microwave transparent material.

7. The method of claim 1 wherein the directing step is performed with the catalyst placed on a microwave transparent holder configured to allow the methane plasma to pass through the catalyst.

8. The method of claim 1 wherein the methane gas comprises pure methane or natural gas.

9. A method for producing a hydrogen enriched fuel comprising:
preparing a catalyst by coprecipitation of a nickel based catalyst precursor such that the catalyst has a composition of Ni81Al, Ni93Al, Ni77Cu16Al, Ni54Cu27Al or Ni83Mg6Al, where Ni comprises NiO, Al comprises $Al_2O_3$, Cu comprises CuO and Mg comprises MgO;
forming a methane plasma using microwave irradiation of a methane gas under a negative pressure of from 20 mmHg to 200 mmHg, at a flow rate of 120 ml/minute and at a microwave power of from 70-140 W;
directing the methane plasma over the catalyst to convert at least some of the methane gas to fibrous carbon and hydrogen; and
controlling a flow of the methane plasma and the microwave power to produce a product gas comprising about 70% to 90% unreacted methane and about 10% to 30% hydrogen, and a solid carbon product comprising the fibrous carbon.

10. The method of claim 9 wherein the catalyst has the composition Ni81Al.

11. The method of claim 9 wherein the forming the methane plasma step is performed by placing the catalyst on a microwave transparent holder having a plurality of openings configured to allow the flow of methane gas around the catalyst.

12. The method of claim 9 further comprising processing the product gas to recover substantially pure hydrogen.

13. The method of claim 9 further comprising flowing the product gas under a vacuum pressure through a Pd/Ag membrane to recover substantially pure hydrogen.

14. The method of claim 9 wherein the microwave power is less than 120 W.

15. The method of claim 9 wherein the negative pressure is from about 20 mmHg to about 200 mmHg, and the microwave power is from about 70 W to 160 W.

16. The method of claim 9 further comprising pretreating the catalyst in a hydrogen plasma prior to the directing step.

17. A method for producing a hydrogen enriched fuel comprising:
providing a tube reactor having microwave transparent walls in flow communication with a methane source configured to provide a flow of methane through the tube reactor;
preparing a catalyst by coprecipitation of a nickel based catalyst precursor such that the catalyst has a composition of Ni81Al, Ni93Al, Ni77Cu16Al, Ni54Cu27Al or Ni83Mg6Al, where Ni comprises NiO, Al comprises $Al_2O_3$, Cu comprises CuO and Mg comprises MgO;
pretreating the catalyst in a hydrogen plasma using microwave irradiation at a first microwave power directed through the wall of the reactor and the holder;
irradiating the methane using microwave irradiation at a second microwave power less than the first microwave power to produce a flow of methane plasma;
directing the methane plasma over the catalyst; and
producing a solid carbon product comprising fibrous carbon and a product gas by converting at least some of the methane to hydrogen by reaction of the methane plasma in contact with the catalyst, the product gas comprising about 10-30% hydrogen and about 70-90% methane.

18. The method of claim 17 wherein the microwave power is from about 70 W to 140 W and a flow rate of the methane is about 120 ml/minute.

19. The method of claim 17 wherein the negative pressure is from about 20 mmHg to about 200 mmHg.

20. The method of claim 17 wherein the methane plasma comprises $CH_4$.

21. The method of claim 17 wherein during the producing step reactions occur on the catalyst between hyrodcarbons and radicals to produce hydrogen and the fibrous carbon.

22. The method of claim 17 wherein the directing the methane plasma step comprises placing the catalyst on a holder having a plurality of openings configured to allow the flow of methane gas over the catalyst.

23. The method of claim 17 further comprising flowing the product gas under a vacuum pressure through a Pd/Ag membrane to recover substantially pure hydrogen.

* * * * *